United States Patent [19]
Steffan et al.

[11] Patent Number: 6,092,123
[45] Date of Patent: Jul. 18, 2000

[54] METHOD AND APPARATUS FOR CHANGING FUNCTIONS OF A HARDWARE DEVICE USING TWO OR MORE COMMUNICATION CHANNELS

[75] Inventors: Jeffrey Raymond Steffan; Lih-Chung Kuo; Barbara Yvonne Bailey, all of San Jose; Calvin Kuo-Lee Tang, Saratoga, all of Calif.

[73] Assignee: International Business Machines Corporation, Armonk, N.Y.

[21] Appl. No.: 08/895,716

[22] Filed: Jul. 17, 1997

[51] Int. Cl.⁷ ............................. G06F 13/14; G06F 13/20
[52] U.S. Cl. ............................. 710/8; 710/131; 709/221; 709/238; 709/239
[58] Field of Search .......................... 709/221, 238, 709/239; 710/131, 8, 1; 395/500

[56] References Cited

U.S. PATENT DOCUMENTS

| | | | |
|---|---|---|---|
| 4,920,497 | 4/1990 | Upadhyaya et al. | 364/491 |
| 4,951,220 | 8/1990 | Ramacher et al. | 364/488 |
| 5,036,473 | 7/1991 | Butts et al. | 364/489 |
| 5,153,880 | 10/1992 | Owen et al. | 371/10.2 |
| 5,161,157 | 11/1992 | Owen et al. | 371/10.2 |
| 5,448,496 | 9/1995 | Butts et al. | 364/489 |
| 5,452,231 | 9/1995 | Butts et al. | 364/489 |
| 5,524,243 | 6/1996 | Gheorghiu | 395/650 |
| 5,615,105 | 3/1997 | Tofigh et al. | 364/138 |
| 5,726,584 | 3/1998 | Freidin | 326/38 |
| 5,726,788 | 3/1998 | Fee et al. | 359/163 |
| 5,805,834 | 9/1998 | Mckinley et al. | 395/283 |
| 5,838,165 | 11/1998 | Chatter | 326/38 |
| 5,859,959 | 1/1999 | Kimball et al. | 395/182.02 |

*Primary Examiner*—Thomas C. Lee
*Assistant Examiner*—Rehana Perveen
*Attorney, Agent, or Firm*—Gray Cary Ware Freidenrich

[57] ABSTRACT

The present invention concerns a method, apparatus, and article of manufacture which provides an efficient way to change the function of a programmable logic unit included in a control device—where the control device manages the operational characteristics of a hardware unit—without having to disable system access to the hardware unit during the updating process. The hardware unit remains fully functional throughout execution of the updating method. To perform the update, the hardware unit must be connected to a host system by at least two communication channels. Each communication channel includes a control device including a programmable logic unit. The programmable logic unit is pre-programmed by a first data set which establishes its predetermined operational characteristics. Upgrading the programmable logic unit is accomplished by logically removing one of the communication channels leading from the host system to the hardware unit. A second data set is copied to the programmable logic unit along the removed channel after its integrity is verified. System access to the hardware unit via the logically removed channel is then reestablished.

19 Claims, 7 Drawing Sheets

METHOD AND APPARATUS FOR CHANGING FUNCTIONS OF A HARDWARE DEVICE USING TWO OR MORE COMMUNICATION CHANNELS

BACKGROUND OF THE INVENTION

1. Field of the Invention

The present invention generally relates to changing the function of a control device. More particularly, the invention concerns an apparatus, method, and article of manufacture for upgrading the logical configuration of a field programmable gate array integral to a control device for a hardware element.

2. Description of the Related Art

In the manufacture of computers, it is a common practice to use a control device, or controller, to manage the operational characteristics of a hardware element. In turn, the controller commonly includes a programmable logic device ("PLD"). This arrangement allows the operational characteristics, or functions, of the controller to be updated as necessary. One example of this arrangement is using a field programmable gate array or "FPGA"—one type of PLD—to manage the operational characteristics of a direct access storage device controller for a direct-access storage disk ("DASD").

Typically, one part of the controller is a dedicated special-purpose microprocessor which controls the details of input and output ("I/O") data transfers to and from an I/O device. The microprocessor manages the details of the command and data transfer after a main processor initiates the transfer. Using a controller allows the main processor to proceed with execution of a program while the command or data transfer takes place.

Although a controller manages the data transfer for the I/O device, the method in which the data is transferred is limited to the original configuration of the controller. To overcome this limitation and allow the controller configuration to be changed without physically removing the controller, an FPGA is used in conjunction with the controller. The FPGA is a programmable device which stores its programming configuration in volatile random access memory cells. The memory cells are typically located within the FPGA. By changing the configuration of the FPGA, the operational characteristics of the controller can be altered. This occurs because the logic gates within the FPGA are reconfigured to allow the input commands or data sent to the controller to be managed differently than before.

To program an FPGA, a desired logical configuration is copied to the FPGA from a storage unit when the computer is started. Logical configuration refers to the actual configuration of the FPGA, and is accomplished by sending configuration data to the FPGA to establish the "personality" of the FPGA. The "personality" of the FPGA refers to the method by which the FPGA performs requested functions, or receives or outputs data or commands. In this regard, the sequence in which the FPGA handles commands or data may be altered by changing the programming, i.e. the configuration of the FPGA. Similarly, the timing and sequencing at which commands or data are sent may also be changed. By changing the way the FPGA handles commands and data, the operational characteristics of the controller can be modified.

Once configured, the FPGA receives data and/or commands from a processor in a host computer when a request is made from the host computer for an associated I/O device to perform an operation, such as retrieving stored data or locating a requested location on a disk. The FPGA then manages the transfer and any data or commands to the I/O device. The I/O device executes the request. This arrangement—using an FPGA to establish the operational characteristics of the controller—allows the functions performed by the controller to be altered without having to physically replace the controller or any of its components. By changing the controller's operational characteristics, the operation of the I/O device associated with the controller is altered.

Generally speaking, there are two instances where an FPGA is configured. As indicated above, the first instance is when an FPGA begins from a cold start. One example is a power-on reset after which the device is devoid of data; another example is where a power disturbance causes the FPGA's configuration to fail.

The second instance in which an FPGA is configured is during normal operation, when the power is on and the device already contains a specific configuration. In this case, the user may desire to change the FPGA to a different configuration.

In the quest to find faster methods for re-configuring an FPGA, several methods have evolved. One method is known as the "master serial mode." Here, the FPGA receives configuration data and commands from a special serial programmable read only memory, or "PROM," when the FPGA is otherwise disabled from receiving data or commands from a host computer. The PROM is specifically programmed with the configuration data for the FPGA. The contents of the PROM are customarily generated using development tools provided by the FPGA manufacturer or the manufacturer of the hardware device which the FPGA is being used to control. During the configuration operation, the FPGA reads in the PROM's contents bit-by-bit. In the master serial mode, the timing and control signals of the configuration operation are controlled by the FPGA. A major concern in using this arrangement is that one PROM is required for each FPGA. The overall component cost of the PROMs and the board real estate requirements can be considerable if multiple FPGAs are involved.

Another technique of configuring FPGAs is the "master parallel mode." As with the master serial mode immediately above, the FPGA controls the timing and control signals for the operation. The difference in the two methods is that the FPGA reads the configuration data from an 8-bit PROM one-byte at a time instead of one-bit at a time. Nevertheless, because the FPGA then serializes the data for internal utilization, this method of configuring the FPGA ultimately requires the same amount of time as the master serial mode. Unfortunately, the same cost and real estate requirements associated with the master serial mode still apply.

Another method is the "slave serial mode," so named because the FPGA does not control the configuration sequence. Instead, timing and control of signals during the configuration operation are performed by hardware devices external to the FPGA. For example, the configuration may be controlled by a host computer to which the FPGA is integrated, by a microprocessor, by an operator of the computer configuring the FPGA directly from a storage disk, or any similar method.

A major problem with each of the programming techniques discussed above is that the I/O hardware device that is being managed by the controller—a DASD in the case of a DASD controller—must be disabled from receiving input or sending output to the system during the FPGA reconfiguration process. Effectively, the I/O hardware device is operationally unavailable during the configuration process. In computers that are continuously in operation, the unavailability of the I/O hardware device can cause significant economic loss and inconvenience, even in computers using redundant hardware elements.

SUMMARY OF THE INVENTION

Broadly, the present invention concerns a method, apparatus, and article of manufacture which provides an efficient way to change the functions of a control device incorporating a programmable logic unit without having to disable system access to an associated I/O hardware element during the change-over process. In other words, the I/O hardware element remains fully functional throughout execution of the method to change the function of the programmable logic unit.

To perform the method, the I/O hardware element is preferably connected to a host system by at least two communication channels. While one channel is disabled from receiving data and commands from the host system, at least one other channel allows the I/O hardware element to remain accessible to the system. Each channel includes a programmable logic unit. The programmable logic unit is pre-configured using a first data set copied to the programmable logic unit by using one of the programming methods discussed above, or any technique for configuring the programmable logic unit. The configuration of the programmable logic unit establishes the operational characteristics of the control device which manages the operation of the I/O hardware element.

To change the function of the programmable logic unit, a communication channel leading to the I/O hardware element is chosen and disabled from receiving or sending data or commands from the I/O hardware element to the host system. As a result, all data and commands are routed to the I/O hardware element via one or more of the other communication channels. This allows the I/O hardware element to remain operational while the function of the programmable logic unit is changed. Thereafter, a second data set is copied to the programmable logic unit via the disabled communication channel. Availability of the upgraded channel then reestablished and data and commands may again be routed to the I/O hardware element via the upgraded channel. The second data set reconfigures the programmable logic unit to modify the operational characteristics of the associated I/O hardware element.

In one embodiment, the invention may be implemented to provide a method to change the operational characteristics of a I/O hardware element using operational steps such as those discussed above. In another embodiment, the invention is an apparatus that changes the function of the programmable logic unit while the I/O hardware element remains accessible to the system. In still another embodiment, the invention is an article of manufacture comprising a data storage device tangibly embodying a program of machine-readable instructions executable by a digital data processing apparatus to perform method steps for changing the functional data set for a programmable logic unit.

The invention affords its users with a number of distinct advantages. Generally, the invention allows the operational characteristics of the controller to be changed while the I/O hardware element remains on-line. This allows for the change-over to take place without disrupting operation of the system. Another advantage is that the invention allows the functions and/or throughput rates of the controller to be updated or enhanced while the I/O hardware element remains operational.

Another benefit is that the invention allows correction or modification of design flaws in the operation of the I/O hardware element or the controller device which were discovered after shipment of the product. An example would be changing the timing sequence in which an operation was performed by the control device, thereby altering the timing sequence in which data or commands are received by an I/O hardware element. Another advantage is that the invention allows the integrity of the second data set copied to the programmable logic unit of the controller to be verified immediately prior to the actual functional change taking place. This assures that the method does not disable a communication channel which it cannot later make accessible to the host system. This situation occurs when a communication channel is disabled and a corrupted data set is copied to the programmable logic unit. Once the unit is reconfigured with the corrupted data set, the programmable logic unit cannot be initialized, thereby preventing the communication channel with which it is associated from being brought back on-line by the change of function. Because the communication channel has been disabled from receiving data and commands from the host system, the channel is stuck "in limbo."

Another benefit of the present invention is that it allows the operational characteristics of the control device to be upgraded without having to physically replace or remove the control device. Generally, the current invention fulfills the need to be able to change the operational characteristics of a control device while the associated I/O hardware element remains operational, allowing the functional change to take place without disruption to the operation of the host system.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

One aspect of the invention concerns an apparatus which provides an efficient way to change the operational characteristics of hardware control devices which are part of a computer system without having to disable system access to an associated hardware unit during the change of characteristic process. One example of this apparatus is shown in FIG. 1 by various hardware components and interconnections.

Figure 1:
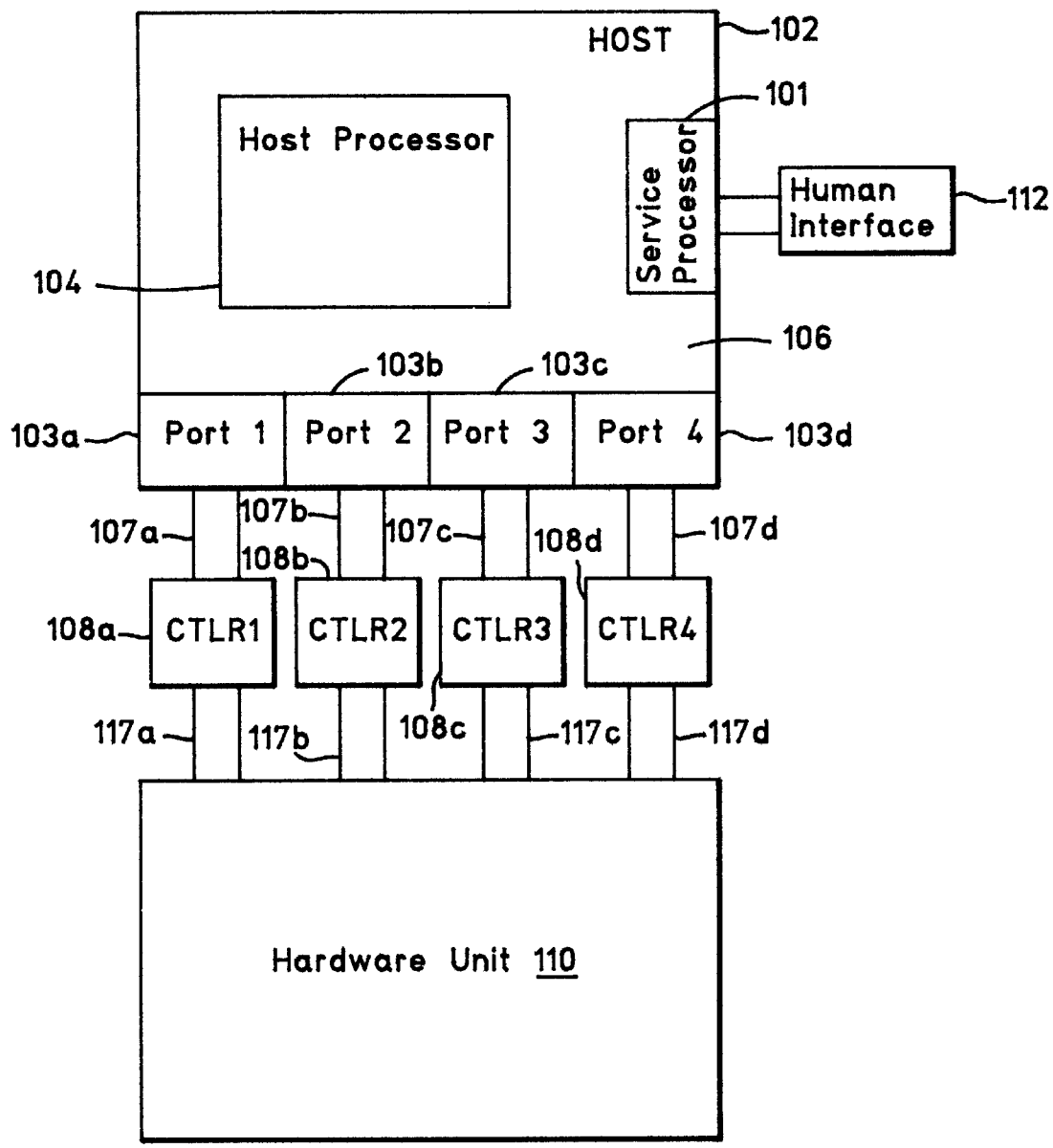
FIG. 1 is a block diagram of hardware components and interconnections used in an exemplary embodiment of the current invention.

Broadly, the apparatus shown in FIG. 1 is interfaced with a host system 102 having a host processor 104. Data is exchanged between the host processor and a hardware unit 110 via communication channels which include parallel control devices 108(a) through (d). These exchanges are in accordance with commands or data transferred from the host system.

A variety of host systems may embody the host processor 104. The host system will generally include processor units, data storage units, and data input and output units. A service processor 101 and a human interface 112 may also be installed. Examples of host systems are the S/390 computer system and the AS/400 computer system, both available from the International Business Machines Company, Armonk, N.Y. Commands and data transfers sent from the host processor 104 flow through a host port 103 to communication channels which assist in assuring a uniform interface between the host processor 104 and the hardware unit 110.

In FIG. 1, four parallel communication channels are shown. For clarity of discussion, only the channel including control device 108(d) will be described. However, the description may be equally applied to each of the other channels. Although multiple communication channels are shown in FIG. 1, the current invention is not limited to use with only multi-channel systems. Any number of communication channels could be used as long as at least two paths for communication are maintained between the host 102 and the hardware unit 110. Using communication channels in the preferred embodiment allows for a higher level of transfer of I/O data and commands. Channel levels are chosen such that they will present a uniform interface to the host processor 104. This allows for the host processor 104 to issue commands for all channels identically and apply the commands to all channels, rather than the commands having to be I/O device specific.

Depending on the capabilities for multi-programming the channel, different types of channels may be used as discussed below. Regardless of the type of channel, the channels execute channel programs, which consist of a sequence of channel commands that allow chaining of data and commands from the host processor 104 to the hardware unit 110. Also, because of its uniform and consistent interface, the communication channel also eases the implementation of device drivers.

In the preferred embodiment, the communication channels form a multiplexor channel. A multiplexor channel is a channel in which the control device 108(d) can be multi-programmed. Multiprogrammed refers to using the control device 108(d) to support various hardware elements, which may require the control device to be programmed with respect to each hardware element. A multiplexor channel allows several I/O operations, which may involve the host port, to be performed simultaneously. This form of multi-programming the host port requires a set of device control/status and data registers for each device port. When one or more device ports and devices are executing I/O operations, other device ports and devices may be selected to start new operations.

In another embodiment, the communication channels are selector channels where the control device 108(d) is not multiprogrammed. A selector channel remains logically connected to the hardware unit 110 for the duration of an operation. Selector channels are typically used to connect devices with high data transfer rates. Examples of these types of devices are disk drives and magnetic tape drives. When a selector channel is logically connected to the hardware unit 110, it is busy and not capable of accepting commands for any other hardware device that might also be connected to a respective host port.

In the preferred embodiment, the communication channel includes a host port, such as the port 103(d), which presents status and control information to the host processor 104, and receives commands and addresses from the host processor. The channel also includes paths 107(d) and 117(d), and a control device 108(d) for coordinating I/O sequencing and making I/O less time critical between the host system 104 and the hardware unit 110.

Together, paths 107(d) and 117(d) connect the host system 102 to the hardware unit 110. The path 107(d) connects the host port 103(d) to the control device 108(d), and the path 117(d) connects the control device 108(d) to the hardware unit 110. The path may include an interface between the devices and their respective ports. The interface implementation of the path 107(a) and the path 117(a) may be the same, or the interface implementation may differ. For example, the path 107(a) could include a SCSI interface, and the path 117(a) could include a SSA interface. Conversely, both paths 107(a) and 117(a) could include a SCSI interface. In the preferred embodiment, the hardware unit 110 is a DASD. In another embodiment, the hardware unit 110 may comprise multiple hardware elements such as DASD's, modems, or other hardware devices. Depending upon whether a multiplexed or selector communication channel is used, the devices may be connected via a dedicated path or via a shared path, respectively.

The control device 108(d) is a controller for a DASD in the illustrated embodiment. In another embodiment, the control device 108(d) may be any control device managing communications between different elements of a computer, or any device using an application-specific integrated circuit ("ASIC") to assist in managing the operational characteristics of an element of a computer. Although four parallel control devices are shown, any number of parallel control devices may be operationally modified using the present invention as long as the hardware unit 110 is not removed from system access during the upgrade process.

Figure 2:
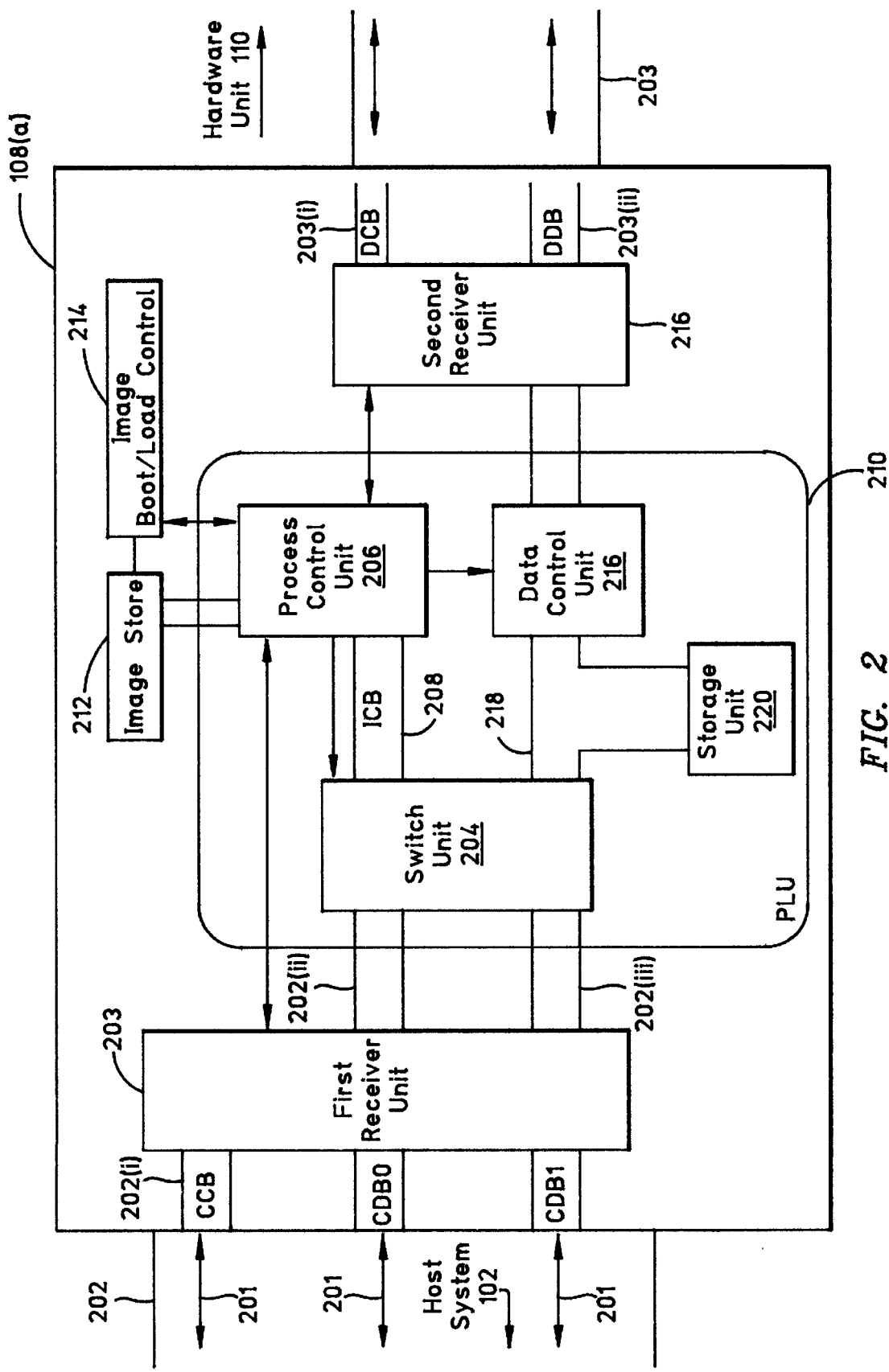
FIG. 2 is a functional block diagram of an exemplary embodiment of a control device shown in FIG. 1 and used pursuant to the invention.

FIG. 2 shows a preferred embodiment for the control device 108(d). The control device 108(d) assists in controlling the operational characteristics of the hardware unit 110 and also passes data to and from the hardware device. The control device 108(d) receives commands and data from the host processor 104, and issues appropriate commands to direct the hardware unit 110 to take the necessary action to execute the host's commands. For example, operational characteristics concerning interface timing and data sequencing may be managed, as well as other characteristics. Also, the control device 108(d) might act to prevent an illegal operation request from reaching the hardware unit 110, returning an error message to the host processor 104 instead.

The control device 108(d) comprises a first bus unit 202 of path 107(d) which connects the host system 102 to the control device 108(d). A second bus unit 203 of path 107(d) connects the control device 108(d) to the hardware unit 110. The first and second bus units 202 and 203 may consist of any number of busses, but in the preferred embodiment, the first bus unit 202 comprises three busses 202(i) through 202(iii), and the second bus unit 203 comprises two busses 203(i) and 203(ii). The first and second bus units 202 and 203 are bi-directional as indicated by arrows 201.

The control device 108(d) also includes a first receiver unit 203 connected to the host system 102 and the programmable logic unit 210. The control device 108(d) also includes a second receiver 216 connected to the hardware unit 110 and the programmable logic unit 210. The first receiver unit 203 is connected to the host system 102 via busses 202(i) through 202(iii). The second receiver unit 216 is connected to hardware unit 110 via busses 203(i) and 203(ii) in the preferred embodiment. Preferably, the receiver units 203 and 216 are buffers used to assist in the orderly transfer of data and commands from the host 102. In another embodiment, the receiver units 203 and 216 may include drivers.

In the preferred embodiment, the programmable logic unit 210 of control device 108(d) includes a switch unit 204 connected to the first receiver unit via bus 202(ii) and bus 202(iii). The switch unit 204 is used to direct incoming commands and data. The switch unit 204 also connects to the process control unit 206 via bus 208. The process control unit 206 may comprise at least one programmable logic device such as a programmable logic array, a field programmable gate array such as the Lucent Technologies OR2C26K, or any other programmable device capable of performing similar functions. An image store unit 212 and an image boot/load control unit 214 also communicate with the process control unit 206, and load a data set into the a process control unit 206 each time the control device 108(d) is cold started. A data control unit 216 communicates with the switch unit 204 via bus 218, and the second receiver 216 unit via bus 203(ii). In the preferred embodiment, the image store unit 212 may be non-volitile.

A storage unit 220 communicates with the switch unit 204 and the data control unit 216 via bus 218. In the preferred embodiment, the storage unit 204 is used to verify the integrity of a data sent from the host system 102 to the control device 108(d) and used to change the function of the programmable logic unit 210 prior to the data set being copied to the image store 212 and then to the process control unit 206. Although a storage unit 220 is shown integral to the programmable logic unit 210, one or more storage units located external to the programmable logic unit 210 could be used. Moreover, the verification process may be by error correction coding, error detection coding, or similar process. For example, a cyclical redundancy check may be performed The storage unit 220 may comprise a flash memory unit such as the AMD 29F040 for verifying the data Alternatively, the storage unit 220 may comprise memory, a processor, logic gates, flash memory, or any hardware which may be used to perform a cyclic redundancy check, error correction coding, or the like.

Additional components may be included in the communication channel. For example, the storage unit 220 may include a static random access memory unit used to store commands for the service processor 101 or the like. The service processor 101, such as a Motorola MC68322, may be located external to the communication channels or may be included in one or all communication channels as long as the processor is accessible by each communication channel. The service processor 101 is used in conjunction with the storage unit 220 to control the upgrade process of the programmable logic unit 210. The communication channel may also include a script storage unit such as a sequencer—like a small processor for for managing data and commands coming from the programmable logic unit 210. A buffer unit such as a FIFO, or "first-in-first-out" unit, may be included for controlling the data rate sent and received between the programmable logic unit 210 and the hardware device 110.

Operation

In addition to the various hardware embodiments described above, a different aspect of the invention concerns a method for upgrading the operational characteristics of the hardware device without having to disable system access to the hardware device during the upgrading process. Such a method may be implemented, for example, by operating the service processor 101 to execute a sequence of machine readable instructions, as described below.

Data Storage Device

Such a method may be implemented, for example, by operating the service processor 101 to execute a sequence of machine-readable instructions. These instructions may reside in various types of data storage units located either in the host system or the communication channels. In this respect, one aspect of the present invention concerns an article of manufacture, comprising a data storage medium tangibly embodying a program of machine-readable instructions executable by a digital data processor to perform method steps to update the operational characteristics of the control device 108(d) without having to disable system access to the hardware element 110 during the upgrading process.

Figure 3:
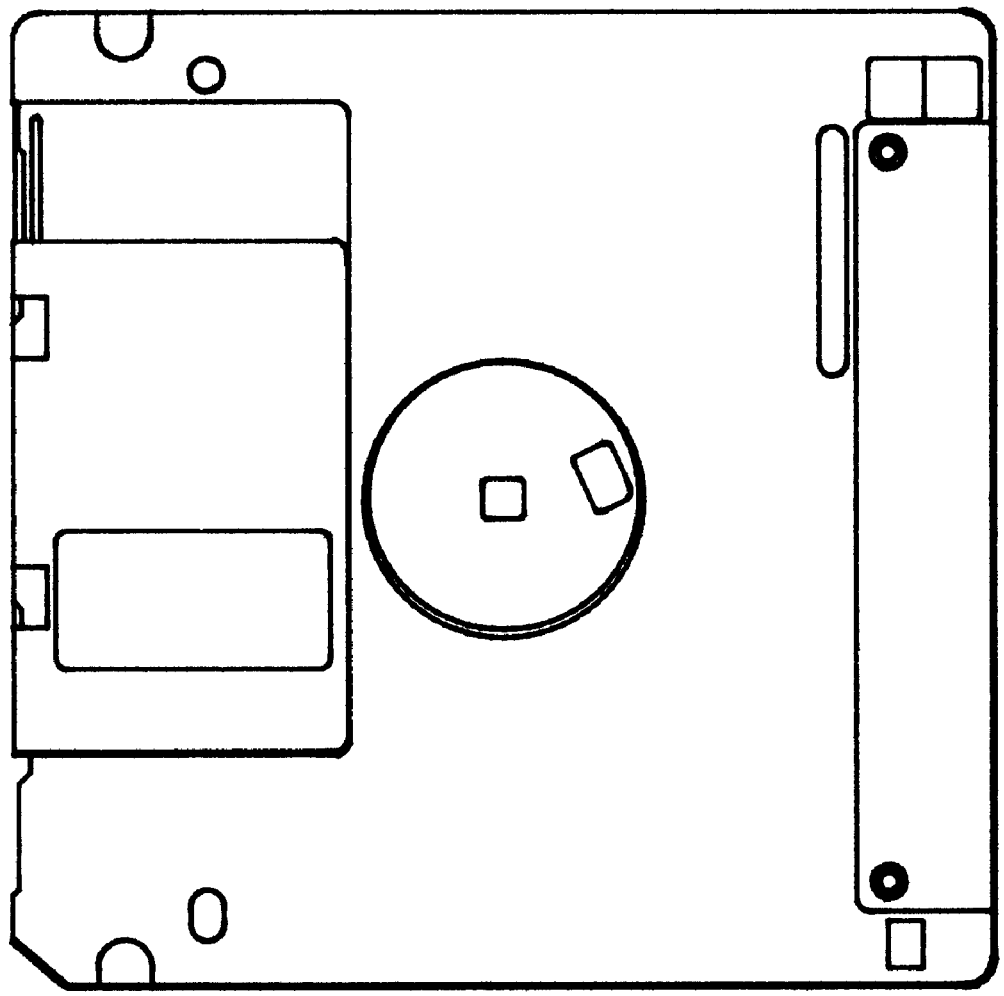
FIG. 3 is a diagram of an illustrative article of manufacture pursuant to the invention.

This data storage medium may comprise, for example, memory units contained within the storage unit 220. The memory units may be located within the communication channels, within the hardware device 110, within the host system 102, or any other location accessible to the communication channels. Alternatively, the instructions may be contained in another data storage medium, such as a magnetic data storage diskette 300 (FIG. 3). Whether contained in a storage unit, the diskette 300, or elsewhere, the instructions may instead be stored on another type of data storage medium such as DASD storage (e.g., a conventional "hard drive" or a RAID array), magnetic tape, electronic read-only memory (e.g., CD-ROM or WORM), optical storage device (e.g. WORM), paper "punch" cards, or other data storage media. In an illustrative embodiment of the invention, the machine-readable instructions may comprise lines of compiled "C-type" or other source code language.

Overall Sequence of Operation

Figure 4:
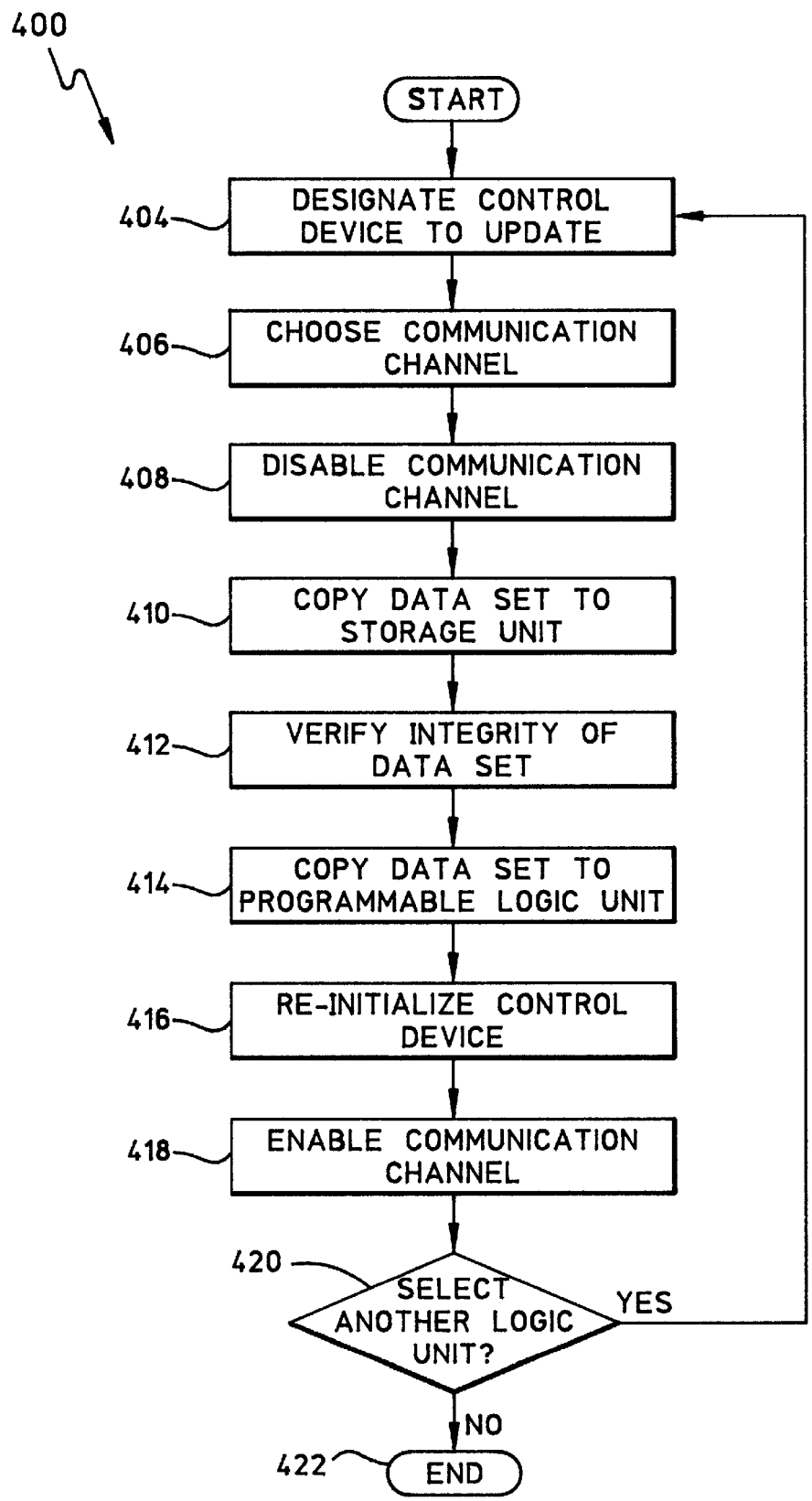
FIG. 4 is a block diagram depicting the operational steps used to change the operational characteristics of the control device of FIG. 1 in accordance with one exemplary embodiment of the invention.
Figure 5:
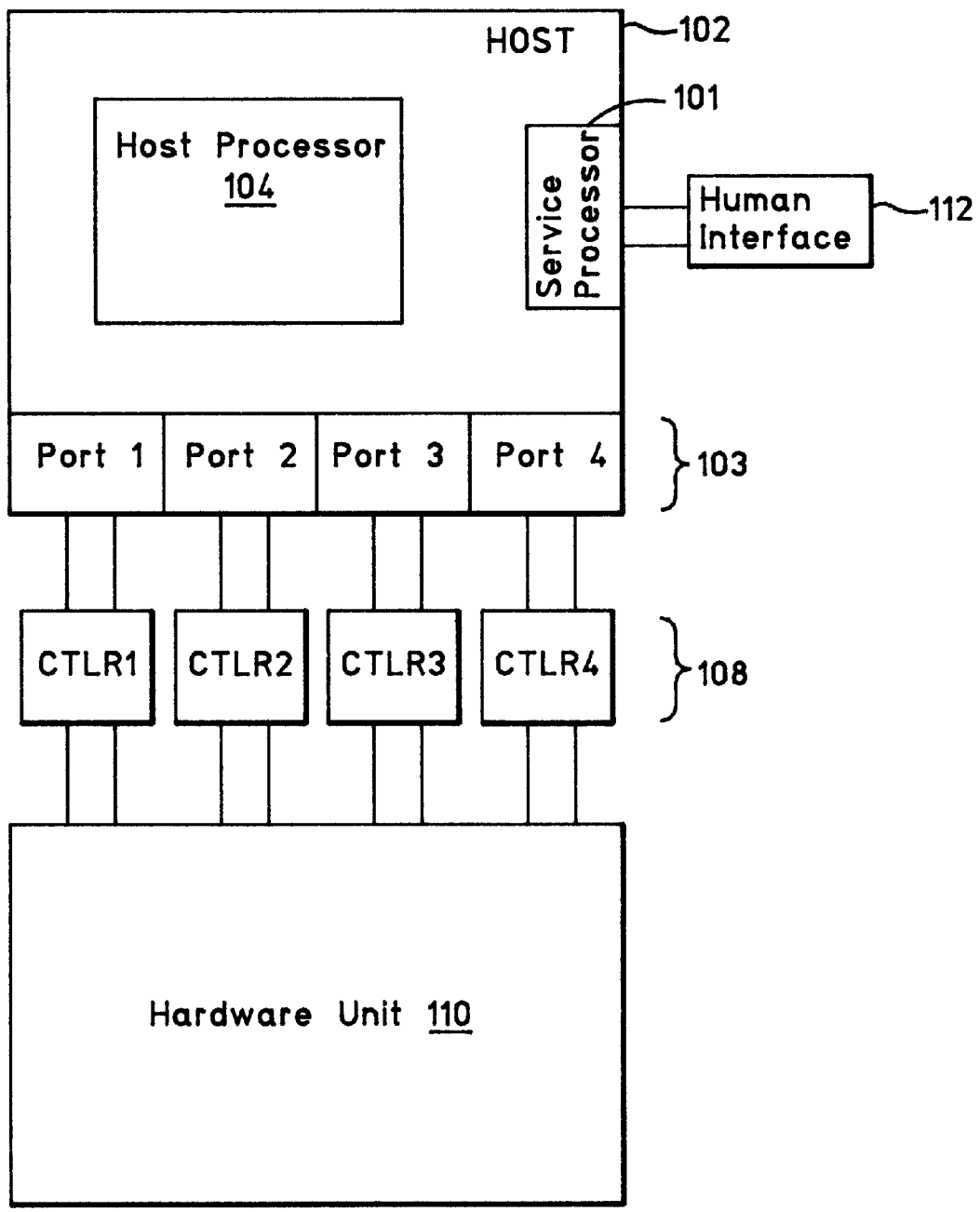
FIGS. 5 through 7 are a series of diagrams showing in greater detail the operational steps illustrated in FIG. 4.
Figure 6:
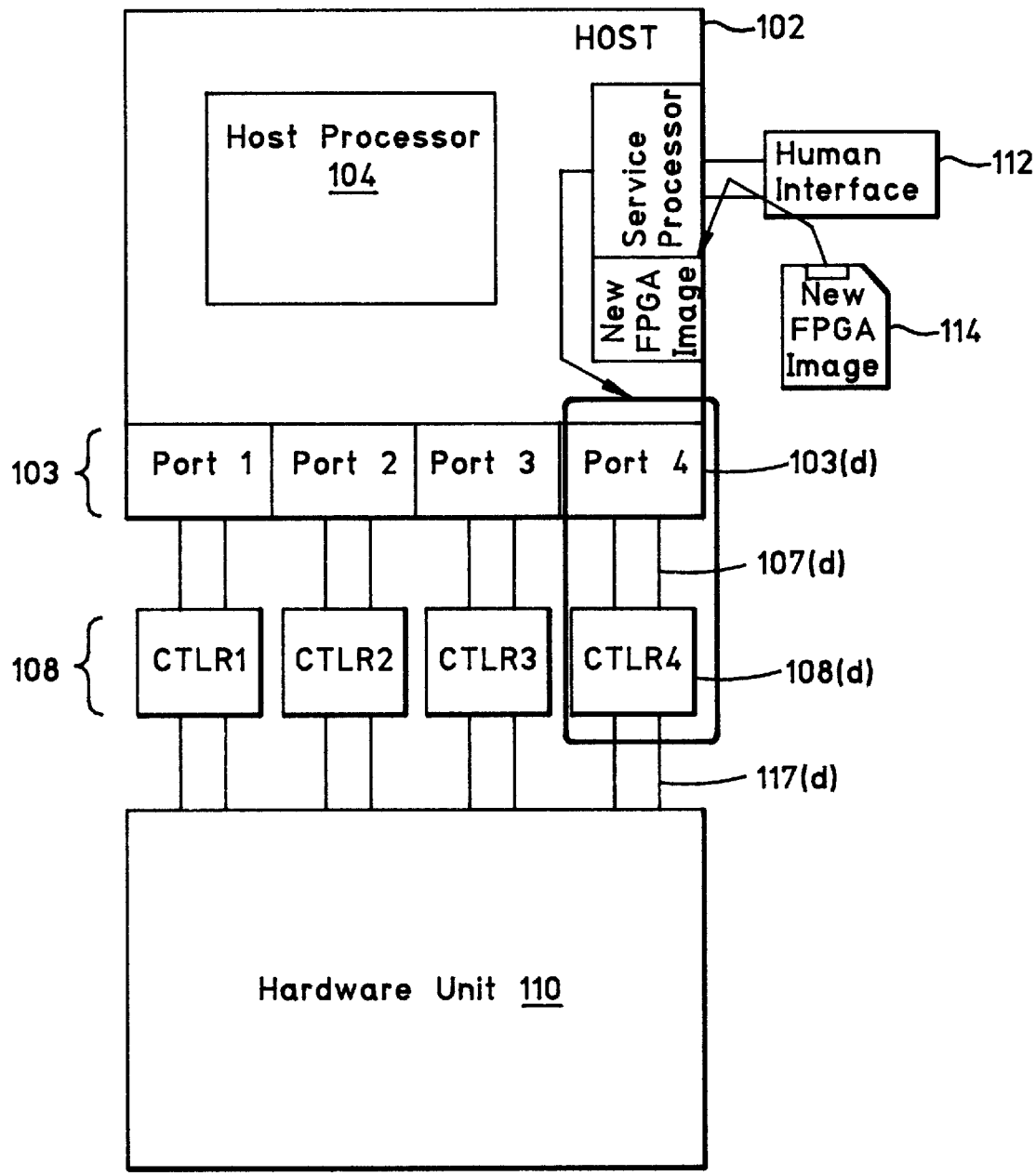
Figure 7:
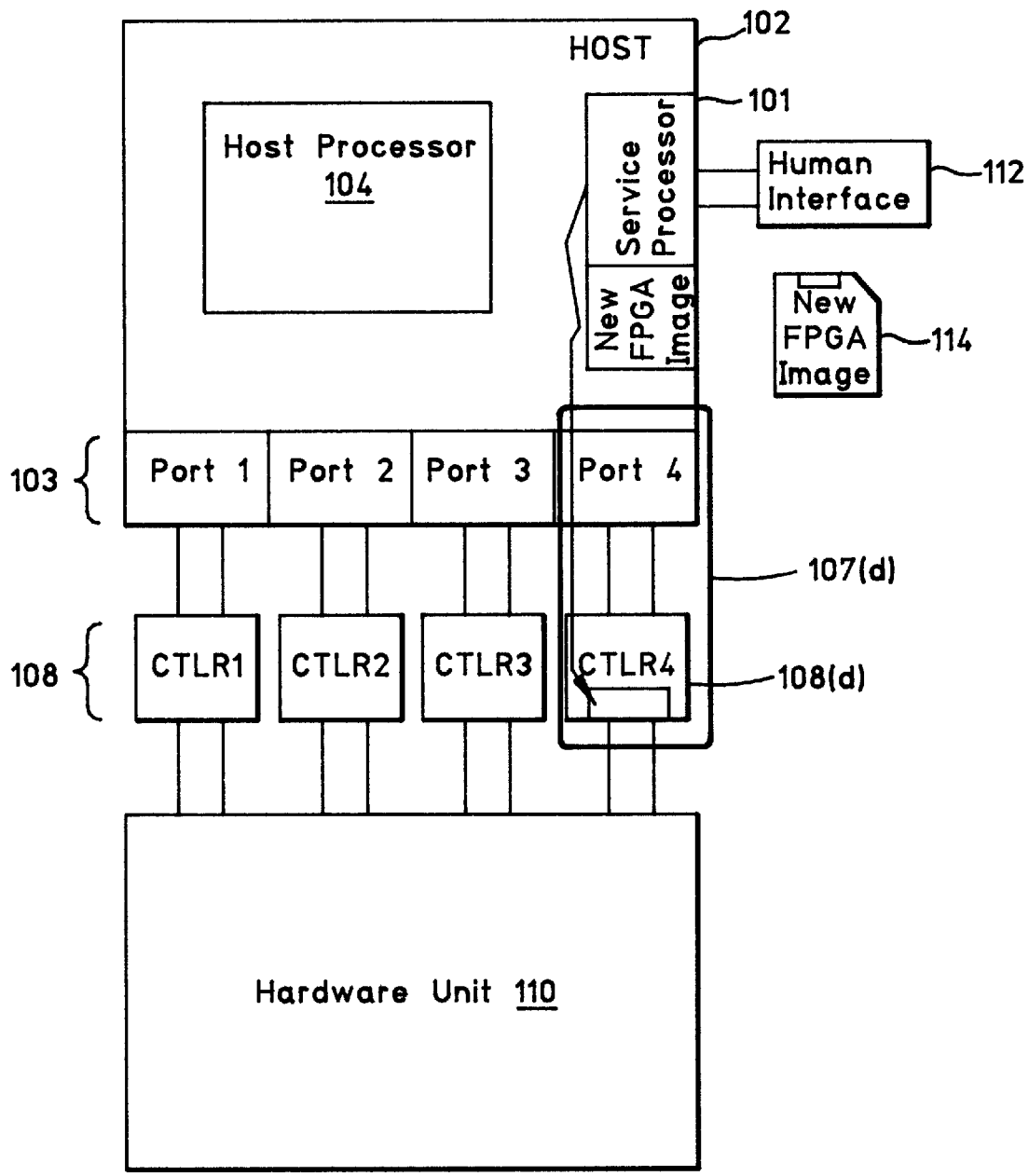

FIG. 4 generally shows the method for upgrading the operational characteristics of a control device without having to disable system access to the hardware unit during the upgrading process. FIGS. 5 through 7 disclose the method in greater detail.

The method 400 begins in task 404 when a control device is designated to have its operational characteristics updated. The communication channel encompassing the control device is chosen in task 406. The control device includes a programmable logic unit, and a storage unit may be included in the control device or the communication channel. The communication channel is logically disabled in task 408, effectively preventing data and commands sent from being sent from the host processor to the control device. A data set is copied to the storage unit and the integrity of the data set is verified in task 412. The data set is then copied to the programmable logic unit in task 414 in order to update its operational characteristics. After the data set has been copied, the control device is re-initiated in task 416 and the communication channel is enabled in task 418. As shown in task 420, if another programmable logic unit serving the hardware unit needs to be updated, the method steps are repeated. Otherwise, the method ends in task 422.

FIGS. 5 through 7 show in detail the method 400 as illustrated in FIG. 4. For ease of explanation, but without any limitation intended thereby, FIGS. 5 through 7 are explained in the context of the hardware unit 10 and control device 108(d). The steps which update the functions of the control device 108(d) are initiated when a different control function is desired by the end user. For example, if a new controller image becomes available which may improve data transfer speeds, fix intermittent timing problems, or otherwise improve the operation of the controller, the update may be performed.

In FIG. 5, the host system 102 is capable of communicating with each host port 103. The service processor 101 communicates with the host processor 104, each of the host ports 103, and the human interface 112. The hardware unit 110 communicates with the host system 102 via the control devices 108. In the preferred embodiment, the steps are initiated at the command of the person performing the update. Commands may be made through a keyboard, floppy disk, or any method allowing the person's command and data to be received by the host processor 104.

Alternatively, the steps may be initiated automatically by the host system 102. To initiate the update automatically, the person updating the control devices 108 copies update data and commands to a static storage location accessible by the service processor 101. At a specified time, or under specified conditions, or similar circumstance, the host system 102 sends the commands and initiates the update method. Typically, this would allow scheduling of the update to take place at a time most convenient for the user of the host system. For example, the update could be scheduled at a time when system resources are at their lowest point of utilization, even if no person was available to perform the update.

FIG. 6 shows a new control image 114 after it has been transferred from a moveable storage media, such as a floppy disk, and stored in the service processor 101. While the host system 102 continues to communicate with the hardware unit 110, the concurrent update of the control devices 108 occurs. A control device 108, which is to have its operational characteristics updated, is selected by the service processor 101. As explained in detail below, the updating method is performed while the hardware unit 110 remains fully accessible to the host system 102. This allows the hardware unit to continue in operation while the update takes place.

Once the control device to be updated is selected, the communication channel containing the control device is chosen. Prior to disabling the channel, at least one other channel must be available to connect the hardware unit 110 to the host system 102. For purposes of this example, the chosen channel is shown in phantom in FIG. 6. The chosen communication channel includes the host port 103(d), paths 107(d) and 117(d), and the control device 108(d).

The chosen communication channel leading to the control device 108(d) is logically disabled from use by the host system 102. Logically disabled refers to prohibiting the transfer of commands or data from the host processor 104 or other elements of the host system 102 to the control device 108(d) via the logically disabled channel To allow the hardware unit 110 to remain accessible to the host system 102 after the path 107(d) has been logically disabled, any command or data sent by the host processor 104 to the hardware unit 110 is routed to the hardware via another path, such as paths 107(a)–(c), which also lead to the hardware unit 110. This results because logically disabling the channel also logically disables the host port 103(d), paths 107(d) and 117(d), and the control device 108(d).

Next, as shown in FIG. 7, the service processor 101 copies the update data set to the control device 108(d) using the logically disabled path 107(d), in the preferred embodiment. The update data is stored in the image storage unit 212 (not shown) and is used to load the switch unit 204, data control unit 216, storage unit 220, and the process control unit 206 (not shown) each time the system is cold-booted. In another embodiment, the data set may be copied directly from a floppy disk, a transportable storage medium or any other storage device capable of being interfaced with the system.

Once the update data is received by the control device 108(d), and prior to storage in the image store unit 212, the storage unit 220 verifies that the update data has not been adversely affected during the copying step. Typical verification may be performed using error detecting or correction coding such as, but not limited to, a cyclical redundancy check. Alternatively, the verification may be done by any device capable of performing the verification prior to the update data being received by the control device 108(d). In another embodiment, the update data set could be copied directly from a floppy disk or the like to the control device 108(d) without a verification step being performed. However, the preferred method is to verify the data set after it has been copied to the control device 108(d).

As explained above, the copying of the update data to the control device 108(d) may be initiated at the command of a person coordinating the update method, or initiated by the host processor 104. The update data re-programs the process control unit 206, switch unit 204, data control unit 206, and storage unit 220, in order to alter the operational characteristics of the control device 108(d). For example, assume the control device 108(d) is a controller for a DASD. The operational characteristics of the controller, such as the timing in which the controller issues data and commands can be changed if the process control unit 206 is re-programmed. Alternatively, the throughput rates of the controller may be changed, or a new function can be added to the controller which it previously could not perform, or a design flaw in the control device 108(d) could be corrected. For example, the control device might have its operational characteristics changed from acting as a type of interface between the host system 102 and the DASD to acting as an interface between the host system and another device, such as a modem.

Once the update task has been completed, the communication channel containing the control device 108(d) with its new control image 114 is re-initiated. In the preferred embodiment, the update process is executed via a command sequence which causes the image boot/load control 214 (not shown) to cold boot. Re-initiating the communication channel comprises logically enabling the channel and making it available to send to and receive commands and data from the host system 102 to the hardware unit 110. Initiating the channel may also include resetting the communication channel elements to identify the updated settings. For example, once the control device 108(d) has been reprogrammed, it may be desirable to perform a test to assure it is in working order. Similarly, it may be desirable to have the control device 108(d) signal the service processor 101 that it is properly functioning, and to signal the host processor 104 that the upgrade was successful. Thereafter, data and commands are again routed to and from the hardware unit 110 via the re-initiated channel, and the non-chosen communication channels continue to send and receive commands and data.

After re-initializing the chosen channel, the service processor 101 seeks and determines whether additional parallel control devices need to be upgraded. If yes, the method is repeated for each device. If no, the method ends.

Other Embodiments

While there have been shown what are presently considered to be preferred embodiments of the invention, it will be apparent to those skilled in the art that various changes and modifications can be made herein without departing from the scope of the invention as defined by the claims. For example, the image storage unit 212 and the image load control unit 214 could be integral to the process control unit 206. The storage unit 220 could contain multiple memory units located both internal and external to the programmable logic device 210. Accordingly, the above description of the present invention should not be interpreted to limit the scope of the appended claims.

We claim:

1. A method for changing functions of a hardware device of a system, the method comprising:

connecting the hardware device to the system with at least two communication channels, each communication channel including a programmable logic unit each programmable logic unit including a first data set establishing predetermined operating characteristics of the hardware device;

choosing one channel;

disabling the one channel from the system by:
  preventing requests for access to the hardware device from passing to the hardware device via the one channel, while maintaining connection between the one channel and the system; and
  routing requests for access to the hardware device via at least one other communication channel,
  copying a second data set to the programmable logic unit of the one channel; and
enabling the one channel by:
  establishing predetermined operational characteristics of the hardware device according to the second data set; and
  routing requests for access to the aware device to the one channel.

2. The method recited in claim 1, the copying step comprising the steps of: copying the second data set to a storage unit;

verifying the integrity of the second data set; and copying the second data set to the programmable logic unit if the integrity of the second data set is acceptable.

3. The method recited in claim 2, wherein each chosen channel includes the storage unit.

4. The method recited in claim 3, wherein the storage unit includes a flash memory and the programmable logic device is a field programmable gate array.

5. The method recited in claim 3, wherein the storage unit includes a static random access storage unit.

6. The method recited in claim 3, wherein the circuitry includes a processor unit, an elastic buffer unit, a script storage unit, a host interface unit, and a hardware interface unit.

7. An article of manufacture comprising a data storage medium tangibly embodying a set of machine-readable instructions executable by a digital processing apparatus to perform method steps for changing the function of a hardware device of a system, the method comprising the steps of:

connecting the hardware device to the system with at least two communication channels each communication channel including a programmable logic unit, each programmable logic unit including a first data set establishing predetermined operating characteristics of the hardware device;

disabling a first communication channel from the system by performing steps comprising;
  preventing requests for access to the hardware device from passing to the hardware device via the first channel, while maintaining connection between the first channel and the system; and
  routing requests for access to the device via at least another communication channel;
  copying a second data set to the programmable logic unit of the first communication channel; and
enabling the first communication channel by performing steps comprising:
  establishing the predetermined operational characteristic of the hardware device according to the second data set; and
  routing requests for access to the hardware device to the first communication channel.

8. The article of manufacture recited in claim 7, the copying step comprising the steps of:

copying the second data set to a storage unit;

verifying the integrity of the second data set; and copying the second data set to the programmable logic unit if the integrity of the second data set is acceptable.

9. The article of manufacture recited in claim 7, wherein said method includes the step of choosing the first communication channel.

10. The article of manufacture recited in claim 8, wherein each communication channel includes the storage unit.

11. The article of manufacture recited in claim 10, wherein the storage unit includes a flash memory and the programmable logic device is a field programmable gate array.

12. The article of manufacture recited in claim 11, wherein the storage unit includes a static random access storage unit.

13. The article of manufacture recited in claim 12, wherein the circuitry includes a processor unit, an elastic buffer unit, a script storage unit, a host interface unit, and a hardware interface unit.

14. An apparatus for changing the fiction of the operational characteristics of a hardware device, comprising:

circuitry including at least two communication channels connecting the hardware device to a host system;

each said communication channel including a programmable logic unit, contents of the programmable logic unit including a first data set establishing predetermined operational characteristics of the hardware device;

a processor unit accessible to the channels;

a storage unit accessible to the channels for changing the operational characteristics of a hardware device by:

choosing one of the channels;

disabling the one channel from the host system by performing steps comprising:
  preventing requests for access to the hardware device from passing to the hardware device via the one channel, while maintaining connection between the one channel and the host system; and
  routing requests for access to the hardware device to the hardware device via at least another channel;
  copying a second data set to the programmable logic unit of the one channel; and
enabling the one channel by performing steps comprising:
  establishing a predetermined operational characteristic of the hardware device according to the second data set; and
  routing requests for access to the hardware device to the one channel.

15. The apparatus recited in claim 14, the copying step including the steps of:

verifying the integrity of the second data set; and copying the second data set to the programmable logic unit only if the integrity of the data set is acceptable.

16. The apparatus recited in claim 14, wherein each path includes the storage unit.

17. The apparatus recited in claim 14, wherein the storage unit includes a flash memory and the programmable logic device is a field programmable gate array.

18. The apparatus recited in claim 14, wherein the storage unit includes a static random access storage unit.

19. The apparatus recited in claim 14, wherein the circuitry includes a processor unit, an elastic buffer unit, a script storage unit, a host interface unit, and a hardware interface unit.

* * * * *